March 26, 1968 H. FREUDENBERGER 3,374,770
FISH BREEDER
Filed Feb. 14, 1967 3 Sheets-Sheet 1
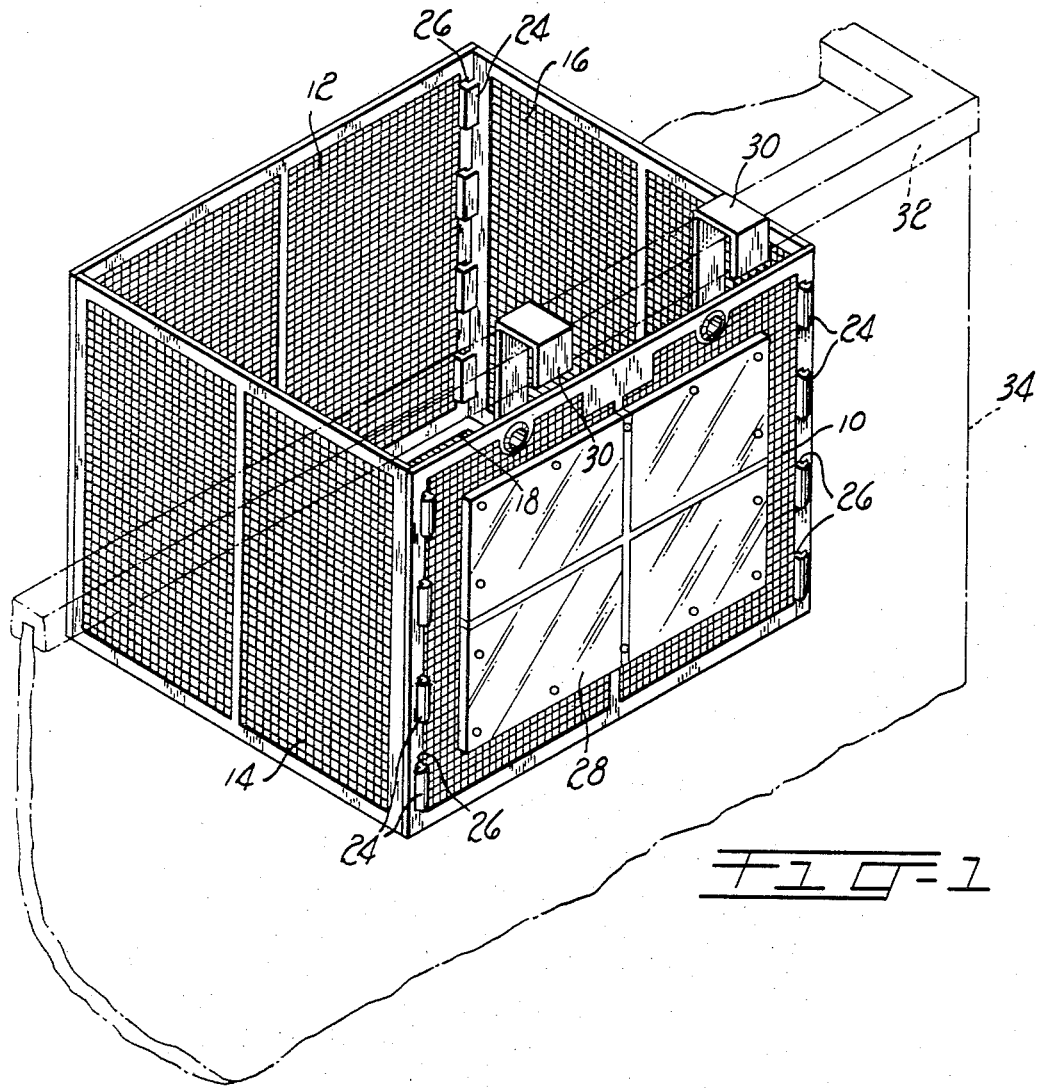
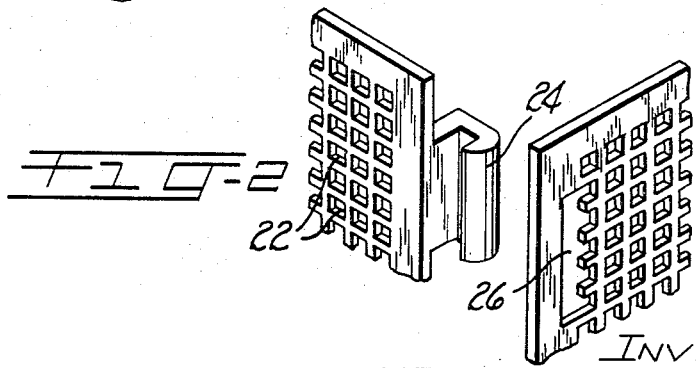
INVENTOR
HENRY FREUDENBERGER
BY Richard S. Shreve
ATTORNEY March 26, 1968  H. FREUDENBERGER  3,374,770
FISH BREEDER
Filed Feb. 14, 1967  3 Sheets-Sheet 2
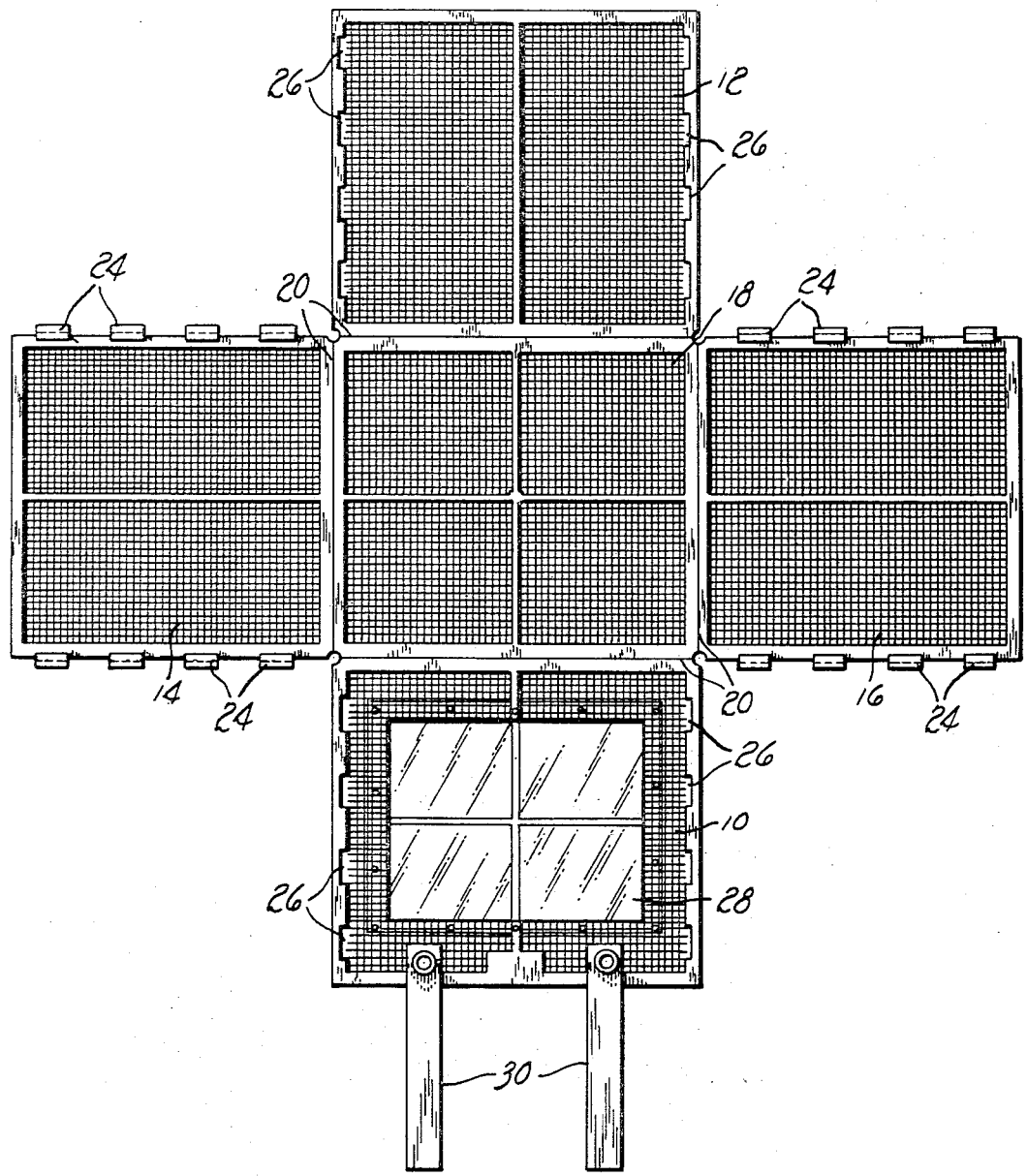

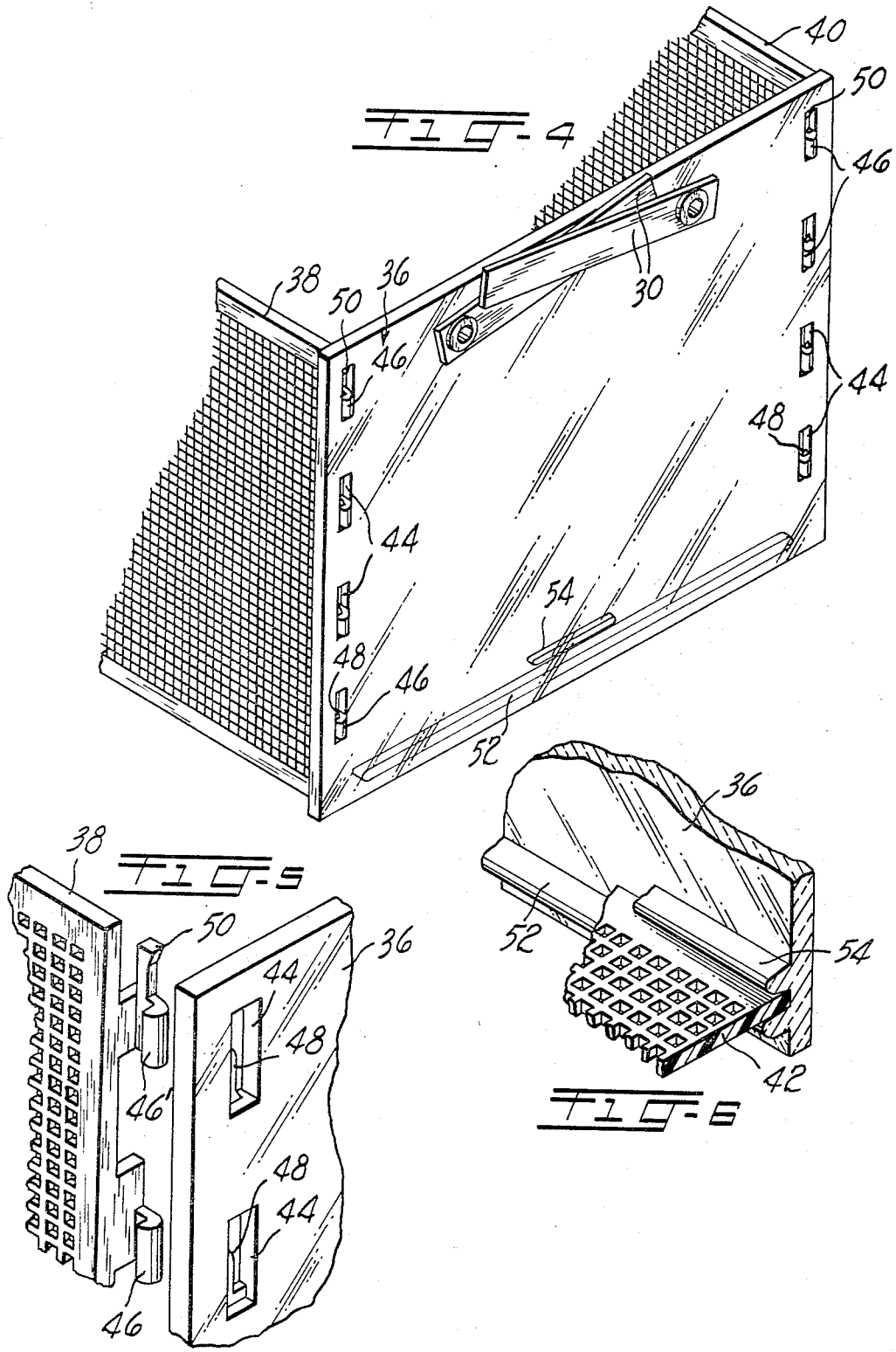

United States Patent Office 3,374,770
Patented Mar. 26, 1968

3,374,770
FISH BREEDER
Henry Freudenberger, Mountainside, N.J., assignor to Springfield Tool & Die Company, Inc., a corporation of New Jersey
Continuation-in-part of application Ser. No. 544,224, Apr. 21, 1966. This application Feb. 14, 1967, Ser. No. 621,719
4 Claims. (Cl. 119—3)

ABSTRACT OF THE DISCLOSURE

Fish breeder comprising a one piece molded plastic box like cage with perforated wall panels snapped together at their mating edges and collapsible to fold flat into overlapping relation.

---

This application is in part a continuation of my abandoned application Ser. No. 544,224 filed April 21, 1966.

This invention relates to fish breeders, and more particularly to a device of this character forming a cage to be immersed in the water of an aquarium to protect the eggs or fry therein while subjecting them to the favorably controlled conditions of the aquarium water.

It has been proposed to provide a bag of netting material stretched over a skeleton frame, but this would require tedious manipulation, difficult storage and would hazard the entrapment or injury of the baby fish.

The main object of the present invention is to provide a folding unit of thermoplastic panels which may be brought into superimposed position for shipment or storage, and opened out to substantially right angled relation for usage.

Other objects are to provide such panels with mating edges joined together by integral molding, and to provide one of said panels with a transparent window.

According to the invention, the fish breeder comprises a box-like cage of sheet-like thermoplastic bottom and side panels, at least two of such panels being perforated, preferably in coordinate patterns, at least one edge of one of said panels and the mating edge of another of said panels being joined together in such a manner that said panels may be brought into superimposed relation. Preferably the mating edges are integrally molded together, and the juncture preferably reduced in thickness and plastic worked by repeated flexing. Preferably the front panel is provided with a transparent window, and the mating edges of the side panels are provided with snap fasteners. The box-like cage is preferably open at the top for convenient access and vision.

In the drawings:

FIGURE 1 is a perspective view of the fish breeder according to one embodiment of the present invention;

FIGURE 2 is an exploded perspective view of the snap fastener employed in FIGURE 1;

FIGURE 3 is a plan view of the one-piece blank for forming the fish breeder shown in FIGURE 1;

FIGURE 4 is similar to FIGURE 1, but showing an improved modification;

FIGURE 5 is an exploded perspective view of the snap fastener employed in FIGURE 4; and FIGURE 6 is an inside partial perspective view of the bottom joint employed in FIGURE 4.

The fish breeder shown in the drawings comprises a box-like cage of sheet-like thermoplastic material, comprising a front panel 10, a back panel 12, right and left panels 14 and 16, and a bottom panel 18.

These panels are preferably formed of transparent or translucent thermoplastic material, preferably polypropylene which is both translucent and flexible. Polyvinyl chloride is clearer, but has short hinge life. Polyethylene is not as clear as polypropylene, and has short hinge life. Ethyl vinyl acetate is too flexible, and does not have good hinge qualities.

These panels are preferably molded flat, in one piece, as shown in FIGURE 3, and from .050 to .080 inch thick, preferably .060. The mating edges of the bottom panel 18 and the respective side panels 10, 12, 14, and 16 are molded integral and are of reduced thickness as at 20. Preferably, these integral reduced junctures are subjected to repeated flexing or plastic working shortly after molding, to increase the life of the hinge joint.

As shown in FIGURE 2, the panels are perforated, preferably molded in coordinate patterns, with suitable draft, the perforations 22 occupying a large proportion of the total area of each panel. The perforations are from .045 to .125 inch square, preferably .050. The larger openings permit eggs or live born fish to escape from cannibalistic parent. The openings in the side panels permit proper circulation of the heated and otherwise conditioned tank water.

The mating edges of the side panels are provided with snap fasteners comprising a hook 24 molded integral with one edge of one side panel, and a slot 26 molded into the mating edge of an adjacent panel.

One of the panels, preferably the front panel 10, is provided with a substantially imperforate transparent window 28, which permits unhindered observation of the baby fish or parent. The window 28 is preferably of thermoplastic material, such as methyl methacrylate. This panel 10 is also provided with suspension hooks 30, adapted to fit over the upper rim 32 above the glass side of the aquarium.

In the modification shown in FIGURES 4, 5, and 6, a transparent front panel 36 is provided, which is separate from the other panels, and extends across from one side panel 38 to the other side panel 40, overlapping both, as well as depending below the bottom panel 42. This panel 36 is of the same material as the window 28 of FIG. 1, and is substantially imperforate, except for vertical slots 44 in the side margins thereof. These slots receive integrally molded hooks 46 of the adjacent side panels 38 and 40. The hooks 46 are shorter in height than the slots 44, to permit the hooks to move downward after entry, to engage over internal flanges 48 on the outer lateral sides of the slots 44.

The upper hook 46' has an integrally molded resilient upper extension finger 50, which snaps under the top of the slot 44 after the hook 46 has descended over the flange 48. This finger 50 can be unlocked by a pencil point or the like, to collapse the box.

The bottom of the separate transparent panel 36 has a horizontal flange 52 extending inward from the bottom portion thereof to engage the front of the bottom panel 42. A shorter parallel flange 54 spaced thereabove serves as a stop, after the bottom flange 52 has snapped under the bottom panel 42.

What is claimed is:

1. Fish breeder comprising a box-like cage of sheet-like plastic bottom and side panels, at least two of said panels being perforated in a waffle pattern in which the width of the perforations and the spaces therebetween are of the order of the thickness of the panels, at least one edge of one of said panels and the mating edge of another of said panels being integrally molded with a reduced thickness therebetween whereby said panels may be brought into superimposed relation for shipment or storage, and opened out to substantially right angled relation for usage with side margins of a pair of said panels extending vertically in abutting relation, one of said side margins having at least one vertical slot intermediate the top and bottom thereof, the vertical margin of the other of said panels having a channel shaped snap fastener passing through said slot.

2. Fish breeder as claimed in claim 1, in which said box-like cage is open at the top, and the bottom and at least three of said side panels are perforated.

3. Fish breeder as claimed in claim 1, in combination with a transparent front panel separate from the other panels and substantially imperforate except for vertical slots in the side margins thereof to receive hooks from the adjacent side panels.

4. Fish breeder as claimed in claim 3, in which said hooks are shorter in height than said vertical slots to permit said hooks to move downward after entry, and said transparent front panel has a horizontal flange extending inward from the bottom thereof to engage the front of said bottom panel.

References Cited

UNITED STATES PATENTS

| | | | |
|---|---|---|---|
| 2,354,098 | 7/1944 | W. Bamber | 229—45 X |
| 2,530,148 | 11/1950 | Bjorklund et al. | 119—17 |
| 2,531,507 | 11/1950 | Goodyear | 229—45 X |
| 2,965,259 | 12/1960 | Johnson | 43—55 X |
| 3,140,691 | 7/1964 | Stark | 119—5 |
| 3,148,822 | 9/1964 | Yochum | 229—45 |
| 3,216,395 | 11/1965 | Girard | 119—3 X |
| 3,276,656 | 10/1966 | Hartmann et al. | 229—45 |
| 3,291,098 | 12/1966 | Halpert | 119—5 |
| 3,304,912 | 2/1967 | Hackman et al. | 119—5 |

ALDRICH F. MEDBERY, *Primary Examiner.*